(12) United States Patent
Longhurst

(10) Patent No.: US 9,473,197 B2
(45) Date of Patent: Oct. 18, 2016

(54) REVERSIBLE TDD TRANSCEIVER

(71) Applicant: SRT MARINE TECHNOLOGY LTD., Midsomer Norton (GB)

(72) Inventor: Phil Longhurst, Bath (GB)

(73) Assignee: SRT Marine Technology Ltd., Midsomer North, Bath (GB)

( * ) Notice: Subject to any disclaimer, the term of this patent is extended or adjusted under 35 U.S.C. 154(b) by 0 days.

(21) Appl. No.: 14/764,319

(22) PCT Filed: Jul. 15, 2013

(86) PCT No.: PCT/GB2013/051890
§ 371 (c)(1),
(2) Date: Jul. 29, 2015

(87) PCT Pub. No.: WO2014/118490
PCT Pub. Date: Aug. 7, 2014

(65) Prior Publication Data
US 2015/0372710 A1 Dec. 24, 2015

(30) Foreign Application Priority Data

Jan. 29, 2013 (GB) .................................. 1301547.4

(51) Int. Cl.
*H04B 1/44* (2006.01)
*H04B 1/00* (2006.01)
(52) U.S. Cl.
CPC .............. *H04B 1/44* (2013.01); *H04B 1/0053* (2013.01)

(58) Field of Classification Search
CPC ....................................................... H04B 1/44
See application file for complete search history.

(56) References Cited

U.S. PATENT DOCUMENTS

| | | | |
|---|---|---|---|
| 6,016,313 A * | 1/2000 | Foster, Jr. | H04W 72/0486 370/330 |
| 6,272,329 B1 | 8/2001 | Sawchuk | |
| 6,356,536 B1 | 3/2002 | Repke | |
| 7,796,636 B2 | 9/2010 | Tsudaka | |
| 2010/0093282 A1* | 4/2010 | Martikkala | H04B 17/364 455/63.4 |

FOREIGN PATENT DOCUMENTS

CN 201878136 U 6/2011

* cited by examiner

*Primary Examiner* — Tuan H Nguyen
(74) *Attorney, Agent, or Firm* — Huffman Law Group, PC

(57) ABSTRACT

A radio transceiver, particularly for use in a time division duplex system, has two reversible transceiver chains, each containing a respective radio frequency mixer; and an intermediate frequency generator, for receiving a baseband signal containing data for transmission, and for generating signals at two different intermediate frequencies modulated with said data. In a receive mode, each transceiver chain receives a respective signal at a respective radio frequency, and the respective radio frequency mixer downconverts the respective signal to a respective intermediate frequency. In transmit mode, one of said signals at the two different intermediate frequencies modulated with said data is passed to the respective radio frequency mixer for upconversion to the respective RF frequency. An AIS transponder includes such a radio transceiver. Miniaturization is helped by reusing certain circuit areas for both transmit and receive.

20 Claims, 5 Drawing Sheets

REVERSIBLE TDD TRANSCEIVER

BACKGROUND OF THE INVENTION

1. Field of the Invention

The present invention relates to a radio transceiver, particularly for use in a time division duplex system. In specific embodiments, the invention relates in particular to a double superheterodyne transponder terminal for receiving and transmitting AIS (Automatic Identification System) signals in the maritime VHF band (156.025 to 162.025 MHz).

2. Description of the Related Art

The rapid uptake of maritime AIS equipment is being driven by the navigational safety benefits and by governmental homeland security mandates in many regions. Whilst large international shipping over 300 tonnes has been obliged to carry class A category AIS for several years, smaller craft have only carried the class B category AIS on a voluntary basis until recent mandates came into force. Class B AIS equipment has been mostly targeted at the leisure boating market and hence has been designed for low cost, high volume commercial manufacture. This, coupled with the desire of many OEMs to build AIS modules into other equipment such as chart plotter displays, has driven the trend towards ever smaller AIS module designs.

FIG. 1 shows a conventional low cost commercial class B AIS transponder. Generally, the transponder 10 shown in FIG. 1 comprises two independent superheterodyne receiver chains 12, 14 and one directly modulated transmitter chain 16.

More specifically, the transponder 10 comprises a VHF antenna port 18, connected to a transmit/receive radio frequency (RF) switch 20. On the receive side, the switch 20 is connected through a first surface acoustic wave (SAW) filter 22 and a low noise amplifier 24 to a passive splitter 26. The splitter 26 is connected to the receiver chains 12, 14.

Thus, a signal entering the first receiver chain 12 is passed to a second SAW filter 28, and then to a first RF mixer 30, where it is downconverted to a first intermediate frequency (IF). The resulting IF signal is passed through a first IF amplifier 32, an IF crystal filter 34, and a second IF amplifier 36 to an integrated second IF mixer and demodulator 38, where it is further downconverted. The resulting baseband signal is output at an output terminal 40.

Similarly, a signal entering the second receiver chain 14 is passed to a third SAW filter 42, and then to a second RF mixer 44, where it is downconverted to a second intermediate frequency (IF). The resulting IF signal is passed through a third IF amplifier 46, an IF crystal filter 48, and a fourth IF amplifier 50 to a second integrated second IF mixer and demodulator 52, where it is further downconverted. The resulting baseband signal is output at a second output terminal 54.

The source of the required local oscillator signals is a quartz reference clock 56, which is connected to a dual PLL synthesiser 58. The dual PLL synthesiser 58 is connected to a first Voltage Controlled Oscillator (VCO) 60, for generating a local oscillator signal at a first local oscillator frequency, and to a second Voltage Controlled Oscillator (VCO) 62, for generating a local oscillator signal at a second local oscillator frequency. The local oscillator signal at the first local oscillator frequency is supplied to a second input of the first RF mixer 30, and the local oscillator signal at the second local oscillator frequency is supplied to a second input of the second RF mixer 44.

Thus, by appropriate selection of the signals at the first and second local oscillator frequencies, signals on the required AIS channels can be detected.

In the transmit chain 16, a clock signal at a known frequency is supplied on one input 70 of a dual fractional-N PLL synthesiser 72, which receives a modulation word from a microprocessor on its second input 74. The dual fractional-N PLL synthesiser 72 can be controlled so that it generates a signal on a chosen one of the two AIS channels in use. The resulting output signal is passed through a transmit path Voltage Controlled Oscillator (VCO) 76, and then through a first RF power amplifier 78 and second RF power amplifier 80 to a harmonic low pass filter 82, before passing through the switch 20 to the antenna 18.

The two receivers 12, 14 normally monitor the two default AIS channels AIS1 and AIS2 collecting position report broadcasts from other AIS terminals within VHF radio range. On a periodic basis the class B AIS transponder 10 transmits its own geographical position data, derived from an on-board GNSS receiver. The timing of this automatic transmission is determined by an internationally agreed protocol based on the Carrier-Sense TDMA system.

SUMMARY OF THE INVENTION

According to a first aspect of the present invention, there is provided . . .

This has the advantage that it facilitates the miniaturization of transceivers such as AIS transceivers by reusing certain circuit areas for both transmit and receive. This has been realised by designing RF circuits to be reversible in operation, which is possible in a time-division duplex (TDD) system with no requirement to transmit and receive simultaneously.

BRIEF DESCRIPTION OF DRAWINGS

For a better understanding of the present invention, and to show how it may be put into effect, reference will now be made, by way of example, to the accompanying drawings, in which: —

DETAILED DESCRIPTION

Figure 1:
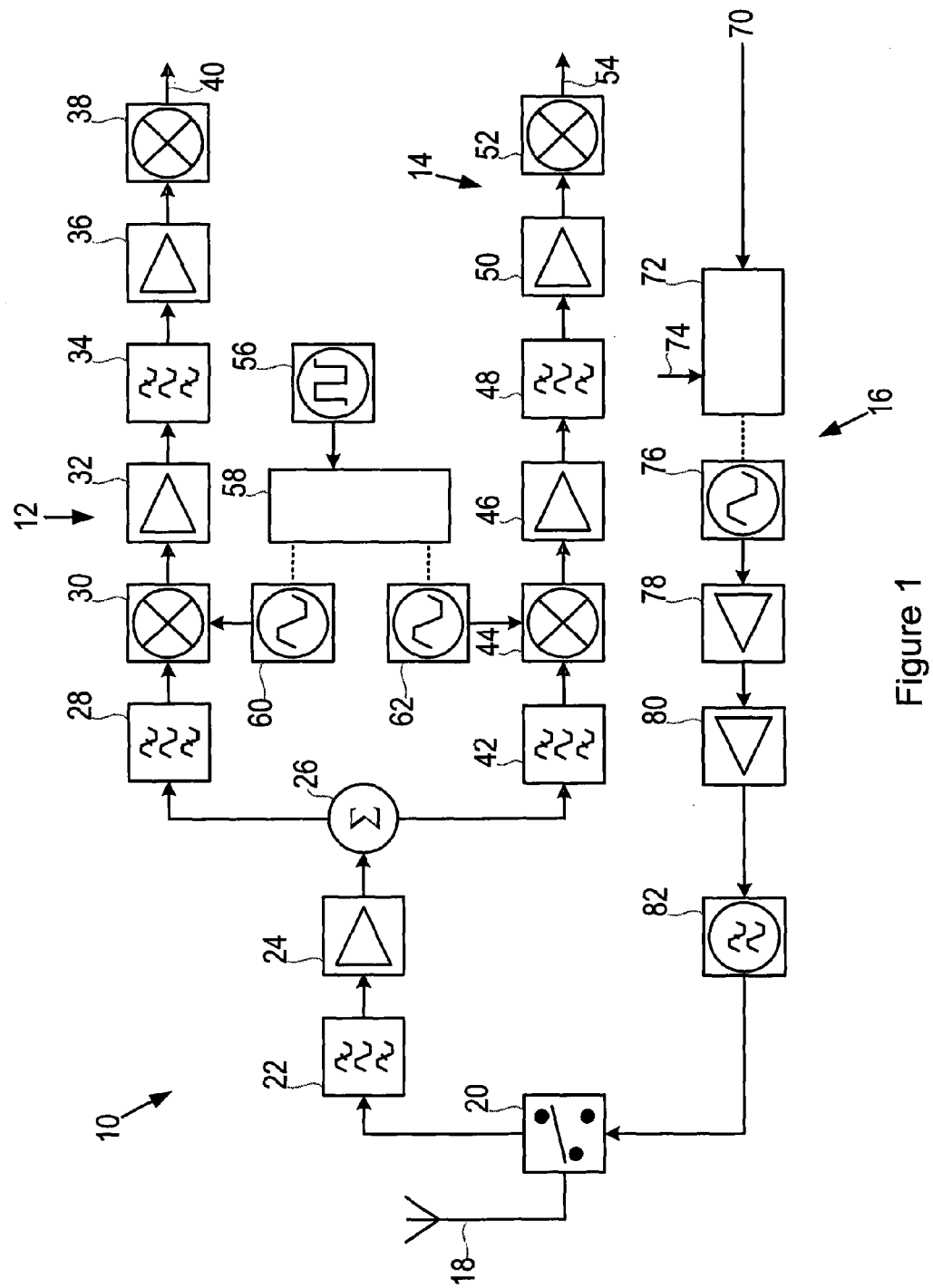
FIG. 1 shows a conventional radio transceiver.
Figure 2:
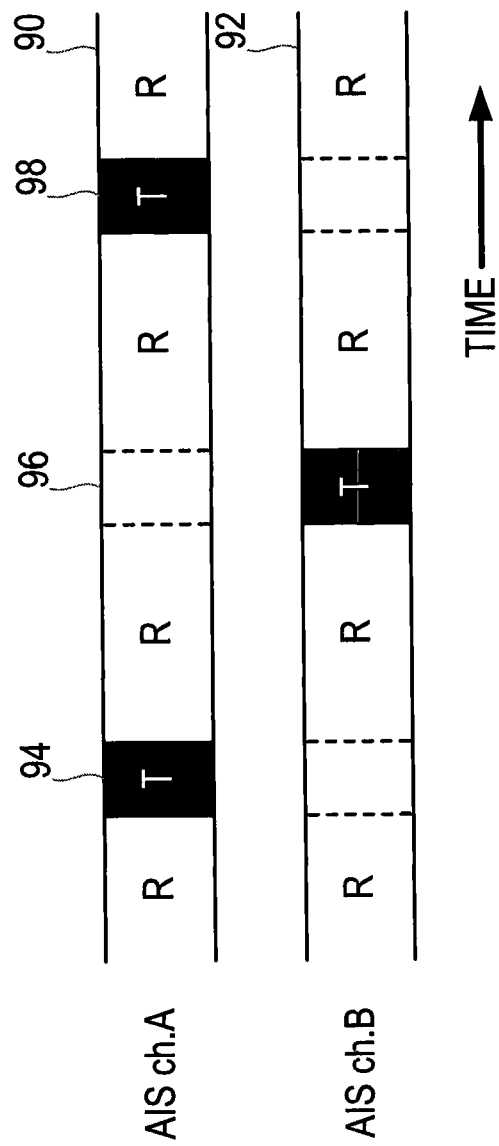
FIG. 2 illustrates signal timings in an AIS transponder.

FIG. 2 shows the operation of a time-division duplex radio transceiver system, and in particular illustrates the operation of an Automatic Identification System (AIS) for use on waterborne vessels. Specifically, the AIS system on a vessel monitors transmissions on two AIS channels 90, 92, identified in FIG. 2 as AIS channel A and AIS channel B. Although the transceiver system is described here with reference to its use in an AIS system, it will be apparent that the same transceiver can be used in any transceiver system, and is particularly useful in a system that operates on a time division duplex basis, especially a system with multiple operating frequencies.

The system also transmits its own signals on the same two AIS channels 90, 92. According to the AIS specification, signalling can take place on any allocated pair of channels, and not necessarily on the default AIS channel A and channel B. However, a class B AIS system is not required to transmit on a channel other than one of the pair of channels on which it has just been receiving.

A Carrier Sense Time Division Multiple Access (CST-DMA) technique is used to ensure that the signals transmitted by the device do not interfere with the signals transmitted by any other nearby AIS device. This means that the device must be able to switch very quickly between reception and transmission, and vice versa, as specified by the international standard IEC62287-1 ed.2.

In addition, the class B transponder is required to perform carrier sensing at the start of a candidate transmission timeslot by receiving signals to check whether an AIS class A transponder or an Aid to Navigation (AtoN) transponder has started to transmit in the same timeslot. Thus, for its own transmissions, the device is able to select timeslots in which there is no competing transmission.

The result is that, as shown in FIG. 2, the device selects one timeslot per frame 94, 96, 98 for its own transmissions T, alternating between transmitting on the two AIS channels indicated by the reference numerals 90, 92. While it is not transmitting, it is receiving (R) on the two channels 90, 92.

Figure 3:
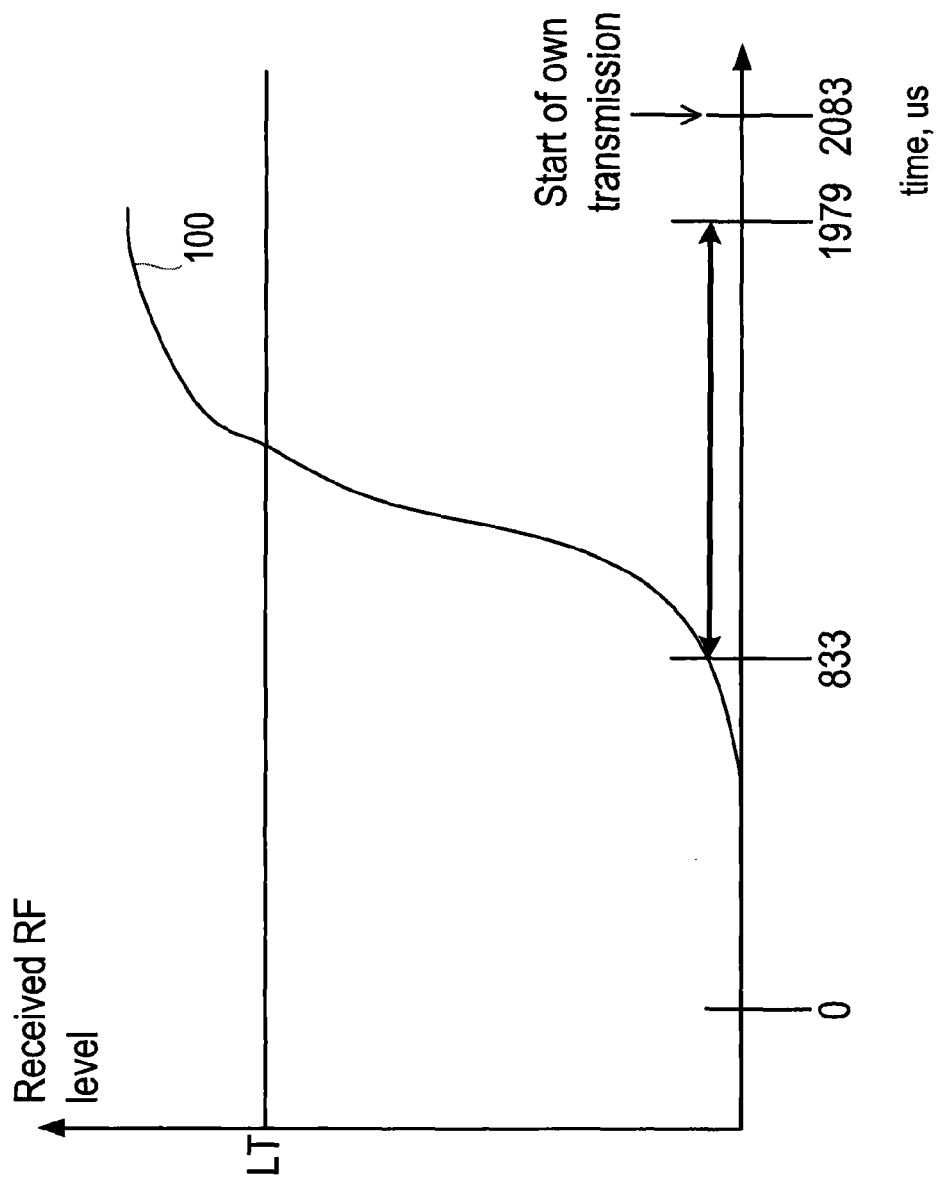
FIG. 3 illustrates in more detail the timings of signals in an AIS transponder.

FIG. 3 shows the operation of the carrier sensing, which places strict conditions on the design of the transmitter. Thus, FIG. 3 shows the received signal strength 100 on a particular carrier, as a function of time, with the time t=0 representing the start of a timeslot that is a candidate for the transmissions from the device. Specifically, the device monitors the signal strength during a carrier sense detection window, which extends from 833-1979 μs from the start of the timeslot. If, as shown in FIG. 3, the received RF signal level exceeds a threshold level $L_T$ during that detection window, then it is determined that the device should not transmit during that timeslot.

However, if the received RF signal level does not exceed the threshold level $L_T$ during the detection window, then it is determined that the device can transmit during that timeslot, and it must then be ready to commence transmission a short time later, i.e. 2083 μs from the start of the timeslot.

Typically this will involve extremely fast lock time synthesiser design for the transmitter in conjunction with the other difficult and often exclusive synthesiser requirements such as low phase noise and spurious. It can also require great care in the power level control design of the transmitter, to ensure that leakage emissions from the awaiting transmitter do not intrude into the particular receiver attempting to perform carrier sensing on the same frequency.

Figure 4:
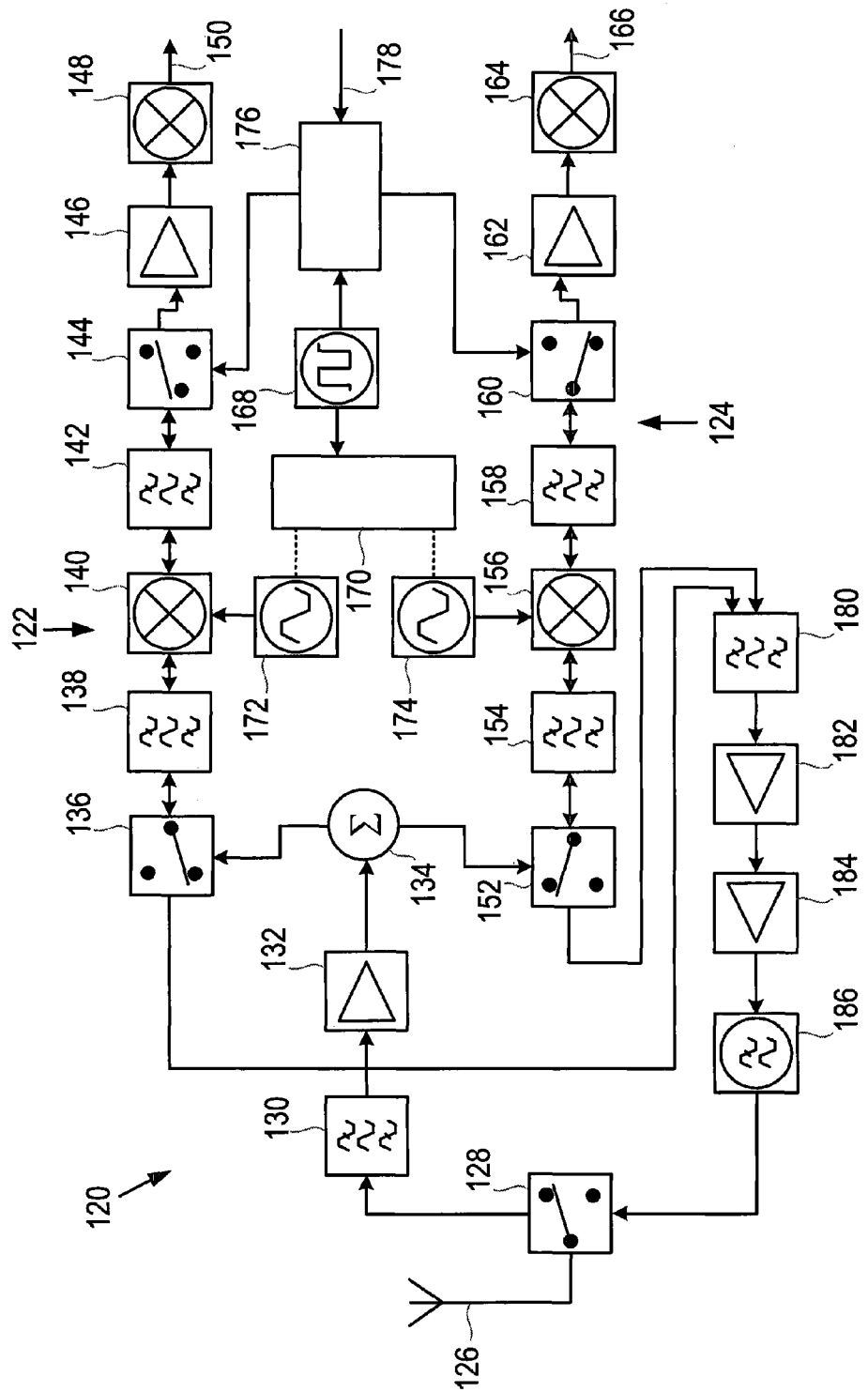
FIG. 4 is a block schematic diagram of a radio transceiver according to the present invention.

FIG. 4 is a block schematic diagram of an RF transceiver that is able to meet these requirements. As described in more detail below, the transceiver 120 shown in FIG. 4 uses a partly reversible RF chain architecture based on IF alternation, in order to reduce the number of components in the device.

The transceiver 120 shown in FIG. 4 is specifically intended for operation in a Time Division Multiple Access (TDMA) radio communications system, such as an AIS transceiver. However, it will be appreciated that the invention is equally applicable to other uses, with suitable modification. In the case of an AIS system, the transceiver is required to receive and transmit signals on two radio frequency channels $F_{RF,A}$ and $F_{RF,B}$.

In order to be able to receive and transmit signals in the two selected channels, the transceiver 120 has two frequency-agile reversible transceiver chains 122, 124.

The transceiver 120 comprises a VHF antenna port 126, connected to front-end circuitry that includes a first transmit/receive radio frequency (RF) switch 128. On the receive side, the switch 128 is connected through a first surface acoustic wave (SAW) filter 130 and a low noise amplifier 132 to a passive splitter 134. The splitter 134 is connected to the reversible transceiver chains 122, 124.

Thus, a received signal entering the first transceiver chain 122 is connected through a second transmit/receive radio frequency (RF) switch 136 to a second SAW filter 138, and then passed to a first RF mixer 140, where it is downconverted to a first intermediate frequency (IF1). The resulting IF signal is passed through a first IF filter 142 to a third transmit/receive radio frequency (RF) switch 144. A received signal is then passed through a first IF amplifier 146 to an integrated second IF mixer and demodulator 148, where it is further downconverted. The resulting baseband signal is output at an output terminal 150.

Similarly, a signal entering the second transceiver chain 124 is connected through a fourth transmit/receive radio frequency (RF) switch 152 to a third SAW filter 154, and then passed to a second RF mixer 156, where it is downconverted to a second intermediate frequency (IF2). The resulting IF signal is passed through a second IF filter 158 to a fifth transmit/receive radio frequency (RF) switch 160. A received signal is then passed through a second IF amplifier 162 to a second integrated second IF mixer and demodulator 164, where it is further downconverted. The resulting baseband signal is output at an output terminal 166.

The source of the required local oscillator signals is a quartz reference clock 168, which is connected to a dual PLL synthesiser 170. The dual PLL synthesiser 170 is connected to a first Voltage Controlled Oscillator (VCO) 172, for generating a local oscillator signal at a first local oscillator frequency LO1, and to a second Voltage Controlled Oscillator (VCO) 174, for generating a local oscillator signal at a second local oscillator frequency LO2. The local oscillator signal at the first local oscillator frequency is supplied to a second input of the first RF mixer 140, and the local oscillator signal at the second local oscillator frequency is supplied to a second input of the second RF mixer 156.

Thus, by appropriate selection of the signals at the first and second local oscillator frequencies, signals on the required AIS channels can be detected, as described in more detail below.

In the case of signals for transmission, a clock signal from the quartz reference clock 168 is supplied to an intermediate frequency generator, or IF alternation generation block, 176, which receives on a second input 178 an input signal, for example from an associated microprocessor, containing the AIS data that is to be transmitted. As is well known, the AIS data includes the identity, position, etc of the vessel on which the device is carried.

Based on these inputs, the IF alternation generation block 176 generates signals at two transmit local oscillator frequencies, as described in more detail below.

The signal at the first transmit local oscillator frequency is supplied to an input of the third transmit/receive radio frequency (RF) switch 144, and then through the first IF filter 142 to the first RF mixer 140.

In the first RF mixer 140, the signal at the first transmit local oscillator frequency is upconverted to radio frequency. The resulting RF signal is passed through the second SAW filter 138 to the second transmit/receive radio frequency (RF) switch 136.

The signal can then be passed by the switch 136 to a fourth RF SAW filter 180, and then through a first RF power amplifier 182 and second RF power amplifier 184 to a harmonic low pass filter 186, before passing through the switch 128 to the antenna 126.

Similarly, the signal at the second transmit local oscillator frequency is supplied to an input of the fifth transmit/receive radio frequency (RF) switch 160, and then through the second IF filter 158 to the second RF mixer 156.

In the second RF mixer 156, the signal at the second transmit local oscillator frequency is upconverted to radio frequency. The resulting RF signal is passed through the third SAW filter 154 to the second transmit/receive radio frequency (RF) switch 152.

The signal can then be passed by the switch 152 to the fourth RF SAW filter 180, and then through the first RF power amplifier 182 and second RF power amplifier 184 to the harmonic low pass filter 186, before passing through the switch 128 to the antenna 126.

Thus, during time periods when the transceiver is receiving signals on the first and second channels, the first transmit/receive radio frequency (RF) switch 128 is connected to pass signals from the antenna 126 to the first SAW filter 130; the second transmit/receive radio frequency (RF) switch 136 is connected to pass signals from the splitter 134 to the second SAW filter 138; the third transmit/receive radio frequency (RF) switch 144 is connected to pass signals from the first IF filter 142 to the IF amplifier 146; the fourth transmit/receive radio frequency (RF) switch 152 is connected to pass signals from the splitter 134 to the third SAW filter 154; and the fifth transmit/receive radio frequency (RF) switch 160 is connected to pass signals from the second IF filter 158 to the IF amplifier 162. This means that, in receive mode, there are no transmit signals being generated at the receive frequency, and so carrier sensing can take place unimpeded.

During time periods when the transceiver is transmitting signals on the first channel, the first transmit/receive radio frequency (RF) switch 128 is connected to pass signals from the low pass filter 186 to the antenna 126; the second transmit/receive radio frequency (RF) switch 136 is connected to pass signals from the second SAW filter 138 to the fourth SAW filter 180; the third transmit/receive radio frequency (RF) switch 144 is connected to pass signals from the IF alternation generation block 176 to the first IF filter 142; and the fourth and fifth transmit/receive radio frequency (RF) switches 152, 160 block all signals.

Similarly, during time periods when the transceiver is transmitting signals on the second channel, the first transmit/receive radio frequency (RF) switch 128 is connected to pass signals from the low pass filter 186 to the antenna 126; the second and third transmit/receive radio frequency (RF) switches 136, 144 block all signals; the fourth transmit/receive radio frequency (RF) switch 152 is connected to pass signals from the third SAW filter 154 to the fourth SAW filter 180; and the fifth transmit/receive radio frequency (RF) switch 160 is connected to pass signals from the IF alternation generation block 176 to the second IF filter 158.

Thus, it is only necessary to provide two synthesisers. As synthesisers are typically available in dual IC packages, in this case used as the dual PLL synthesiser 170, this halves the layout synthesiser IC package count, compared with a transceiver having three synthesisers. Similarly, only two voltage controlled oscillators 172, 174 are required to generate the required local oscillator signals for superheterodyne mixing to/from intermediate frequency (IF). Commonly used RF double balanced mixers and SAW filters are inherently bi-directional devices, and so the architecture shown in FIG. 4 exploits this property to reduce the required RF/IF circuitry, saving space and cost.

Figure 5:
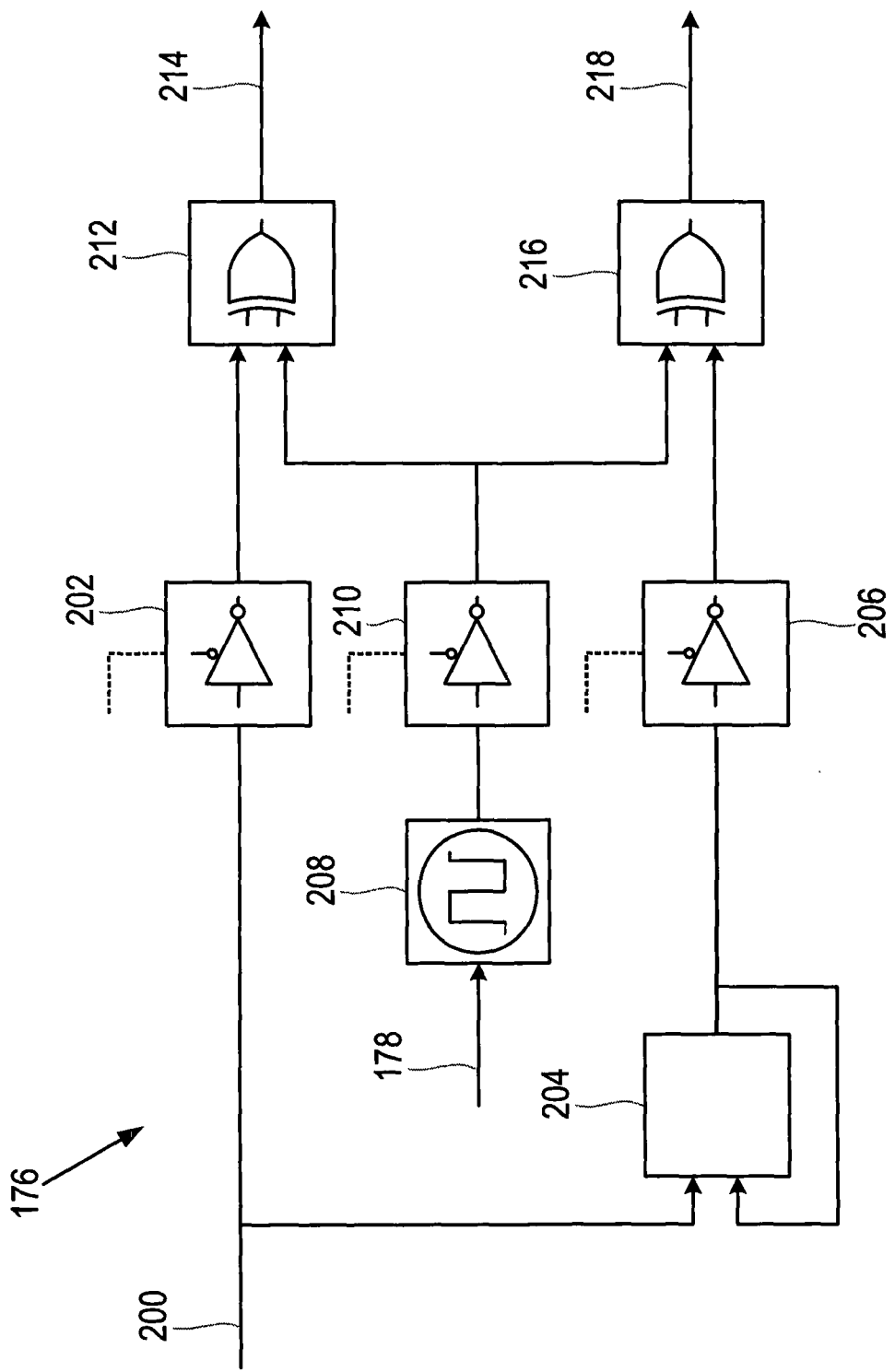
FIG. 5 illustrates in more detail a part of the radio transceiver of FIG. 4.

FIG. 5 shows in more detail the form of the IF alternation generation block 176, in one illustrative embodiment of the invention.

A reference clock signal at a reference frequency $F_{REF}$ is received from the quartz reference clock 168 on an input 200, and applied to a gating buffer 202. The reference clock signal is also applied to a D-type flip-flop 204, acting as a divide-by-2 frequency divider, and the resulting divided reference clock at the frequency $F_{REF}/2$ is applied to a second gating buffer 206.

The gating buffers 202, 206 serve to inhibit the generation of unwanted IF products at CMOS levels during receive intervals, if the oscillator 208 needs to be enabled for calibration purposes.

The IF alternation generation block 176 also includes a CMOS voltage controlled crystal oscillator (VCXO) 208, generating a signal at a basic frequency, specifically having a nominal output frequency $F_{VCXO}$. An input signal, received on the input 178 and containing the physical layer AIS data that is to be transmitted, is applied to the VCXO 208, such that it phase modulates the clock signal at $F_{VCXO}$.

The resulting modulated clock is passed to a respective gating buffer 210.

The reference clock signal at the reference frequency $F_{REF}$ and the modulated clock signal at $F_{VCXO}$ are then passed to a first XOR frequency translator 212 acting as a mixer to generate an intermediate frequency signal at a first transmit intermediate frequency $F_{IF,TX1}$ given by ($F_{VCXO} - F_{REF}$), and this is output to the third transmit/receive radio frequency (RF) switch 144 on the line 214. Also, the divided reference clock signal at the reference frequency $F_{REF}/2$ and the modulated clock signal at $F_{VCXO}$ are passed to a second XOR frequency translator 216 acting as a mixer to generate an intermediate frequency signal at a second transmit intermediate frequency $F_{IF,TX2}$ given by ($F_{VCXO} - F_{REF}/2$), and this is output to the fifth transmit/receive radio frequency (RF) switch 160 on the line 218.

The first and second transmit intermediate frequencies $F_{IF,TX1}$, $F_{IF,TX2}$ are spaced apart to avoid crosstalk. More specifically, in order to allow these two intermediate frequencies to generate transmit signals at any two of the possible frequencies, without the possibility of crosstalk between the two intermediate frequencies, they need to be spaced apart by the total tuning range of the system, plus a guard band. For example, in the case of the AIS system, in which the channels are spaced across a tuning band of 6 MHz, it is advisable for the first and second transmit intermediate frequencies to be spaced apart by at least, say, 8 MHz.

During the transmission time periods, the signal at the first or second transmit intermediate frequency, as the case may be, is then band-limited to remove aliasing products by passing through the respective IF crystal filter 142, 158 which is also used during receive mode. The result is an analogue IF signal that can be passed through to the appropriate mixer 140, 156 to generate the desired transmit frequency. As mentioned above, the active one of the two transmit chains is routed through to the power amplifiers 182, 184 to produce a signal having the desired transmit output power.

Thus, in transmit mode, the mixer 140 is used to upconvert an intermediate frequency signal at the first transmit intermediate frequency $F_{IF,TX1}$ to a first RF channel frequency $F_{RF,A}$, and, in receive mode, is also used to downconvert a received signal at the first RF channel frequency $F_{RF,A}$ to the first transmit intermediate frequency $F_{IF,TX1}$. Thus, the mixer 140 requires a local oscillator signal from the oscillator 172 at a first local oscillator frequency $F_{LO1}= (F_{RF,A}-F_{IF,TX1})$.

The mixer 156 is used in transmit mode to upconvert an intermediate frequency signal at the second transmit intermediate frequency $F_{IF,TX2}$ to a second RF channel frequency $F_{RF,B}$, and, in receive mode, is also used to downconvert a received signal at the second RF channel frequency $F_{RF,B}$ to the second transmit intermediate frequency $F_{IF,TX2}$. Thus, the mixer 156 requires a local oscillator signal from the oscillator 174 at a second local oscillator frequency $F_{LO2}= (F_{RF,B}-F_{IF,TX2})$.

In one illustrative embodiment of the invention, the reference clock signal received from the quartz reference clock 168 has a reference frequency $F_{REF}=19.2$ MHz. This is a suitable choice because it is a standard clock frequency, and hence suitable reference clocks are readily available. Further, no harmonics of the 19.2 MHz frequency fall within the VHF marine band and so, in the specific usage of the transceiver circuit in an AIS transponder, the use of this frequency will not give rise to any interference in that band.

The reference frequency is used to generate one of the intermediate frequencies, and it is also necessary in this particular example to generate the other intermediate frequency. As discussed above, the second intermediate frequency needs to be appropriately spaced from the first intermediate frequency.

In this illustrative example, the reference frequency is passed to the frequency divider 204 to generate a divided reference clock at the frequency $F_{REF}/2=9.6$ MHz. This allows the second intermediate frequency to be generated from a clock that is easily derivable from the reference frequency, while being suitably spaced from the first intermediate frequency.

In this illustrative embodiment, the CMOS voltage controlled crystal oscillator (VCXO) 208 has a nominal output frequency $F_{VCXO}=38.855$ MHz.

Thus, in this illustrative embodiment, the action of the first and second frequency translators 212, 216 means that the first and second transmit intermediate frequencies $F_{IF,TX1}$, $F_{IF,TX2}$ are 19.655 MHz (=38.855 MHz−19.2 MHz) and 29.255 MHz (=38.855 MHz−9.6 MHz) respectively.

The AIS standard does not require the transponder of a class B AIS system to transmit on a channel other than one of the pair of channels on which it has just been receiving. Therefore, when switching from receive mode to transmit mode, it is not necessary using this architecture to alter either of the local oscillator frequencies generated by the local oscillators 172, 174. This has the beneficial effect that it enables ultra-fast (<10 ns) frequency settling of the generated transmit signal along with ultra-fast (<10 ns) amplitude control. This therefore removes the requirement of fast lock time from the local oscillator synthesisers allowing the designer to concentrate on optimising the synthesisers instead for lowest phase noise and spurious for the benefit of improved receiver performance.

In the default mode, the two RF channel frequencies $F_{RF,A}$ and $F_{RF,B}$ are 161.975 MHz and 162.025 MHz.

However, the AIS transponder may be allocated a different pair of "regional variation" channel frequencies, in the frequency range 156.025 MHz to 162.025 MHz. Therefore, the local oscillator frequencies need to be tunable so that they can produce local oscillator signals that are suitable for upconverting the intermediate frequencies to these channel frequencies, and downconvert these channel frequencies to the respective intermediate frequencies.

More specifically, in this particular example, the transceiver path 122 uses a low-side local oscillator. That is, the first Voltage Controlled Oscillator (VCO) 172 generates a local oscillator signal at a first local oscillator frequency LO1 that is lower than the frequency of the RF signal that is to be transmitted.

In this example, the first intermediate frequency $F_{IF,TX1}$ is set to 19.655 MHz, and so the first Voltage Controlled Oscillator (VCO) 172 should be tunable to generate a local oscillator signal at any first local oscillator frequency LO1 19.655 MHz below the range 156.025 MHz to 162.025 MHz, namely in the range 136.37 MHz to 142.37 MHz.

Again, in this particular example, the transceiver path 124 uses a high-side local oscillator. That is, the second Voltage Controlled Oscillator (VCO) 174 generates a local oscillator signal at a second local oscillator frequency LO2 that is higher than the frequency of the RF signal that is to be transmitted.

In this example, the second intermediate frequency $F_{IF,TX2}$ is set to 29.255 MHz, and so the second Voltage Controlled Oscillator (VCO) 174 should be tunable to generate a local oscillator signal at any second local oscillator frequency LO2 that is 29.255 MHz above the range 156.025 MHz to 162.025 MHz, namely in the range 185.28 MHz to 191.28 MHz.

However, it will of course be appreciated that these specific frequency values are applicable only to the specific example described here, and that other frequency values will be selected for applications with a different range of RF channels, and that the frequency values depend on the specific choices that are made for the first and second reference frequencies and the frequency There is thus disclosed a reversible RF architecture that is particularly suitable for use in a TDMA environment. In particular, the transmit IF is digitally generated. However, the scope of the invention is not limited to the specific architecture disclosed.

The invention claimed is:

1. A radio transceiver, comprising:
   two reversible transceiver chains, each containing a respective radio frequency mixer; and
   an intermediate frequency generator, for receiving a baseband signal containing data for transmission, and for generating signals at two different intermediate frequencies modulated with said data;
   wherein, in a receive mode, each transceiver chain receives a respective signal at a respective radio frequency, and wherein the respective radio frequency mixer downconverts the respective signal to a respective intermediate frequency; and
   wherein, in a transmit mode, one of said signals at the two different intermediate frequencies modulated with said data is passed to the respective radio frequency mixer for upconversion to the respective radio frequency.

2. A radio transceiver as claimed in claim 1, comprising an antenna and front-end circuitry, the front-end circuitry including:
   a first switch, for connecting the antenna to a transmit path or a receive path of the radio transceiver in transmit mode or receive mode respectively.

3. A radio transceiver as claimed in claim 2, wherein the front-end circuitry further includes a splitter, in the receive path, for passing a received signal into the two transceiver chains in receive mode.

4. A radio transceiver as claimed in claim 2, wherein the front-end circuitry further includes at least one power amplifier, connected to receive transmit signals from either of the two transceiver chains, and to amplify said transmit signals for, the at least one power amplifier being coupled to said first switch for passing said transmit signals after amplification to the antenna in transmit mode.

5. A radio transceiver as claimed in claim 1, further comprising a respective second switch, associated with each radio frequency mixer,
  wherein each radio frequency mixer is connected to a respective local oscillator to receive a signal at a respective local oscillator frequency,
  wherein each second switch is connected to the intermediate frequency generator and to a respective intermediate frequency mixer,
  wherein the second switches are controllable such that:
    in the receive mode, the intermediate frequency signal generated by each radio frequency mixer is passed to the respective intermediate frequency mixer, and
    in the transmit mode, the respective one of said signals at the two different intermediate frequencies modulated with said data is passed to the respective radio frequency mixer.

6. A radio transceiver as claimed in claim 1, further comprising a dual phase-locked loop synthesizer connected to first and second Voltage Controlled Oscillators, for generating respective local oscillator signals for supply to the respective radio frequency mixers.

7. A radio transceiver as claimed in claim 1, wherein each transceiver chain contains at least one bandpass filter, for passing signals within an expected transmit-receive band, and wherein one of said local oscillator signals is at a frequency higher than the expected transmit-receive band, and one of said local oscillator signals is at a frequency lower than the expected transmit-receive band.

8. A radio transceiver as claimed in claim 1, wherein the intermediate frequency generator comprises:
  a source for first and second reference frequencies;
  a basic frequency generator;
  a first intermediate frequency generator mixer, for receiving the first reference frequency and the basic frequency, and for generating a signal at a first intermediate frequency, wherein the first intermediate frequency is the difference between the first reference frequency and the basic frequency; and
  a second intermediate frequency generator mixer, for receiving the second reference frequency and the basic frequency, and for generating a signal at a second intermediate frequency, wherein the second intermediate frequency is the difference between the second reference frequency and the basic frequency.

9. A radio transceiver as claimed in claim 8, wherein the first and second intermediate frequency generator mixers comprise XOR mixers.

10. A radio transceiver as claimed in claim 8, wherein the source for first and second reference frequencies comprises an input for receiving the first reference frequency, and a frequency divider for forming the second reference frequency from the first reference frequency.

11. A radio transceiver as claimed in claim 10, wherein the first reference frequency is 19.2 MHz, and the second reference frequency is 9.6 MHz.

12. A radio transceiver as claimed in claim 8, comprising a modulator for receiving a data signal, and for modulating the basic frequency with the received data signal.

13. A radio transceiver as claimed in claim 1, wherein each transceiver chain comprises a respective third switch, the third switches being controllable such that, in transmit mode, a signal from only one of the transceiver chains is passed for transmission.

14. A radio transceiver as claimed in claim 1, for use in a time-division duplex system, for receiving signals at first and second radio frequencies, and for transmitting signals on one of the first and second radio frequencies.

15. An AIS transponder, comprising a radio transceiver, wherein the radio transceiver comprises:
  two reversible transceiver chains, each containing a respective radio frequency mixer; and
  an intermediate frequency generator, for receiving a baseband signal containing data for transmission, and for generating signals at two different intermediate frequencies modulated with said data;
  wherein, in a receive mode, each transceiver chain receives a respective signal at a respective radio frequency, and wherein the respective radio frequency mixer downconverts the respective signal to a respective intermediate frequency; and
  wherein, in transmit mode, one of said signals at the two different intermediate frequencies modulated with said data is passed to the respective radio frequency mixer for upconversion to the respective radio frequency.

16. An AIS transponder as claimed in claim 15, wherein the radio transceiver comprises an antenna and front-end circuitry, the front-end circuitry including:
  a first switch, for connecting the antenna to a transmit path or a receive path of the radio transceiver in transmit mode or receive mode respectively.

17. An AIS transponder as claimed in claim 16, wherein the front-end circuitry further includes a splitter, in the receive path, for passing a received signal into the two transceiver chains in receive mode.

18. An AIS transponder as claimed in claim 16, wherein the front-end circuitry further includes at least one power amplifier, connected to receive transmit signals from either of the two transceiver chains, and to amplify said transmit signals for, the at least one power amplifier being coupled to said first switch for passing said transmit signals after amplification to the antenna in transmit mode.

19. An AIS transponder as claimed in claim 15, wherein the radio transceiver further comprises a respective second switch, associated with each radio frequency mixer,
  wherein each radio frequency mixer is connected to a respective local oscillator to receive a signal at a respective local oscillator frequency,
  wherein each second switch is connected to the intermediate frequency generator and to a respective intermediate frequency mixer,
  wherein the second switches are controllable such that:
    in the receive mode, the intermediate frequency signal generated by each radio frequency mixer is passed to the respective intermediate frequency mixer, and
    in the transmit mode, the respective one of said signals at the two different intermediate frequencies modulated with said data is passed to the respective radio frequency mixer.

20. An AIS transponder as claimed in claim 15, wherein the intermediate frequency generator comprises:
  a source for first and second reference frequencies;
  a basic frequency generator;
  a first intermediate frequency generator mixer, for receiving the first reference frequency and the basic frequency, and for generating a signal at a first intermediate frequency, wherein the first intermediate frequency is the difference between the first reference frequency and the basic frequency; and a second intermediate frequency generator mixer, for receiving the second reference frequency and the basic frequency, and for generating a signal at a second intermediate frequency, wherein the second intermediate frequency is the difference between the second reference frequency and the basic frequency.

\* \* \* \* \*